Dec. 21, 1937.  E. G. McDONALD  2,102,853
BRAKE
Filed Sept. 26, 1932   2 Sheets-Sheet 1

INVENTOR.
EUGENE G. McDONALD
BY
McConkey & Smith
ATTORNEYS.

Dec. 21, 1937.　　　　E. G. McDONALD　　　　2,102,853
BRAKE
Filed Sept. 26, 1932　　　　2 Sheets-Sheet 2

INVENTOR.
EUGENE G. McDONALD
BY
McConkey & Smith
ATTORNEYS.

Patented Dec. 21, 1937

2,102,853

UNITED STATES PATENT OFFICE 2,102,853

BRAKE

Eugene G. McDonald, South Bend, Ind., assignor to Bendix Aviation Corporation, South Bend, Ind., a corporation of Delaware Application September 26, 1932, Serial No. 634,972

13 Claims. (Cl. 188—78)

This invention relates to brakes, and is illustrated as embodied in a shiftable-anchorage internal expanding automobile brake.

An object of the invention is to provide a simple and compact operating mechanism for a brake of this type which will not interfere with the knuckle or other parts at the center of the brake. Preferably there is a floating bell crank lever, which in its construction also embodies some specifically novel features, and which engages one end of the friction means on one side of the brake anchorage, and which I prefer to form with openings or the like to clear the anchorage, and which is linked to the other end of the friction means. The operating end of this novel lever preferably extends into the space between the brake backing plate and the brake friction means, where it will not interfere with other parts such as the knuckle or axle at the center of the brake.

Other objects and features of the invention, including a novel brake adjustment which is especially suitable for use with an applying means such as described above, and other novel combinations of parts and desirable particular constructions, will be apparent from the following description of the illustrative embodiments shown in the accompanying drawings, in which.

Figure 1:
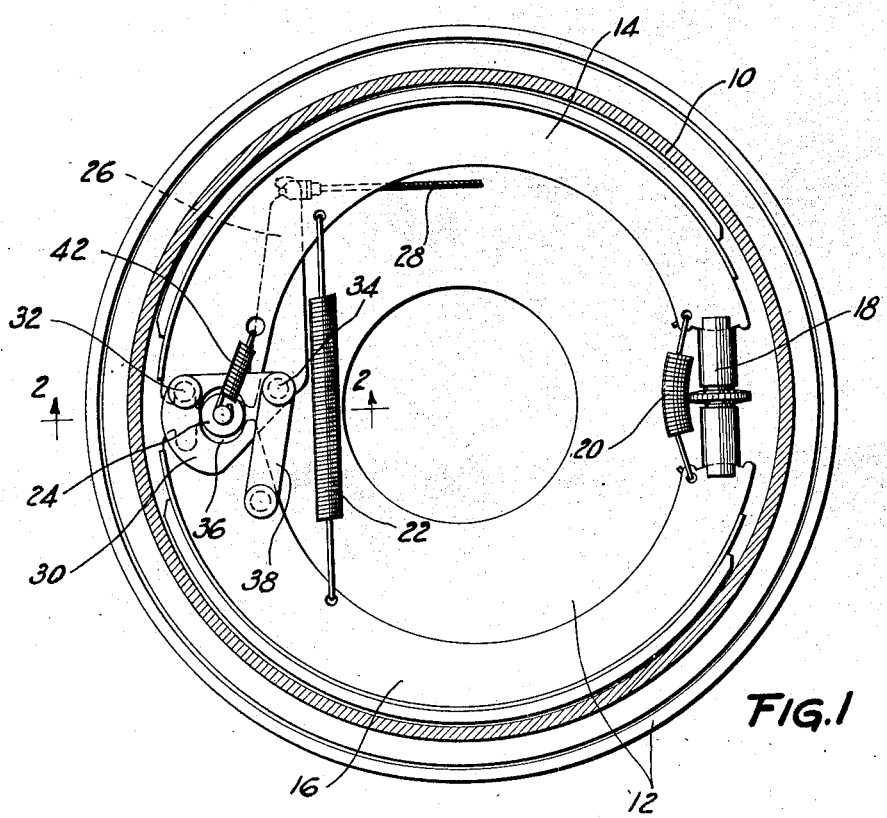
Figure 1 is a vertical section through one form of the brake shoe inside the head of the brake drum, and showing the brake shoes in side elevation.
Figure 2:
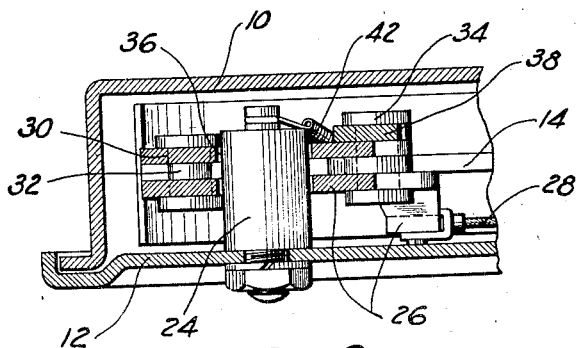
Figure 2 is a sectional view on an enlarged scale and substantially on the line 2—2 of Figure 1 and showing the relationship of the brake applying means to the brake anchorage.
Figure 3:
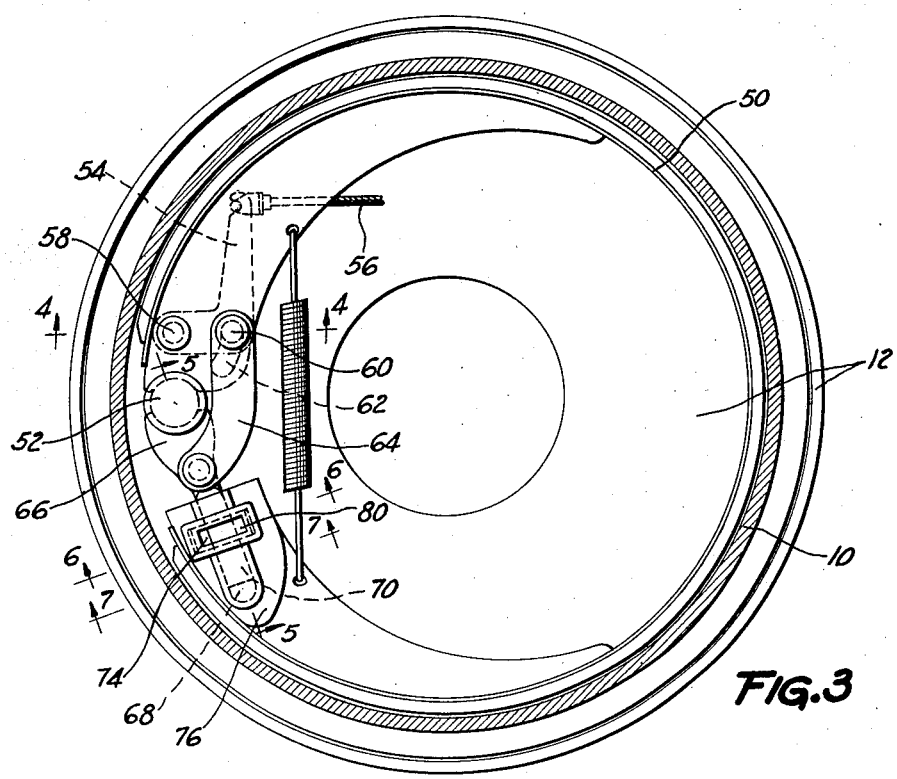
Figure 3 is a section corresponding to Figure 1, but showing a different embodiment in which an adjustable band is used instead of a pair of adjustably articulated shoes.
Figure 4:
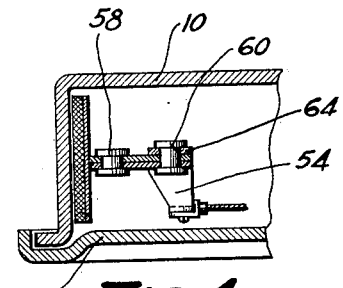
Figure 4 is a partial section on the line 4—4 of Figure 3 and showing the mounting of the novel bell crank lever.
Figure 5:
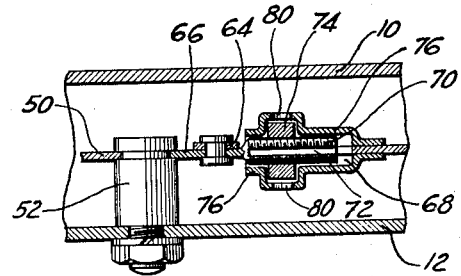
Figure 5 is a partial section on the line 5—5 of Figure 3 and showing the adjustment of the band.

The brake of Figures 1 and 2 includes a rotatable drum 10, turning counterclockwise when the automobile is moving forward.

A support such as a backing plate 12 is arranged at the open side of the drum and cooperates with the drum to form an enclosed housing or brake chamber in which is arranged the friction means of the brake. In the arrangement of Figures 1 and 2 the brake friction means comprises a pair of shoes 14 and 16 connected by suitable adjustable articulation 18 against which the shoes are shown held by a spring 20 tensioned between the shoes. The shoes are shown provided with a return spring 22 connected between them and may be provided with suitable steady rests and the like (not shown).

Between the unarticulated ends of the brake friction means is arranged a suitable brake anchorage, such as a stationary anchor post 24 carried by the backing plate 12. The ends of the shoes 14 and 16 are formed with semi-circular notches embracing the anchor post 24 between them.

According to one feature of the invention, the brake is applied by a novel means shown as including a floating bell crank lever 26 having its upper or operating end extending into the space between the web of the shoe 14 and the backing plate 12, where it is out of the way of parts, such as the knuckle or axle at the center of the brake, and which is connected to a suitable cable or the like 28 preferably extending through the backing plate of the brake and forming a part of a cable-and-conduit or "Bowden" operating mechanism. The particular lever shown in Figures 1 and 2, and which in itself contains some features of novelty, is provided with a parallel and semi-triangular plate 30 secured to its ends by pivot pins 32 and 34, the lever being on the side of the webs of the shoes next the backing plate and the plate 30 being on the opposite side, and with the webs of the two shoes projecting into the space between the lever and the plate. The pivot pin 32 which connects the lever and the plate is arranged for pivotal engagement with a notch in a shoe 14; I prefer to form both the shoes 14 and 16 with a notch suitable for engagement with the pivot 32 so that the two shoes are wholly interchangeable. The lever 36 and the plate 30 are formed with registering clearance openings 36 encircling the anchor post 24 with sufficient clearance to insure that the movement of the lever during the operation of the brake will not be interfered with by the anchor post. The knee lever 26 at the side of which is arranged the pivot 34, is connected by one or a pair of rings 38 with the lower shoe 16.

It will be seen that when power is applied to the tension element 28, the lever 26 is rocked to pass through the pivot 34 with the link 38, pry the ends of the friction means apart and apply the brake. If the drum is turning counterclockwise at the time the brake is applied the shoe 14 will anchor on the post 24, whereas if the drum is turning clockwise, the shoe 16 will anchor on the post 24. In order to provide that when the vehicle is moving forward, which is most of the time, the friction means of the brake will not leave the anchor 24 but will remain continuously in anchoring engagement therewith, I may provide an auxiliary spring 42 tensioned between the anchor post 24 and the upper shoe 14. Of course when the brake is applied with the vehicle moving backwards, in which case the drum is turning clockwise, the shoe 14 will remain anchored and the shoes engage the drum sufficiently for the friction of the drum to overcome the spring 42, whereupon the anchorage will shift and the shoe 16 will engage the anchor post 24.

The arrangement of Figures 3–7 differs from that described above in that the friction means of the brake is in the form of a continuous friction band 50 having reinforcing webs at its opposite ends but being substantially flexible in its central portion. A band 50 may be provided with suitable return springs and steady rests, and the like (not shown).

When the drum is turning counterclockwise, the band 50 anchors directly against an anchor post 52 carried by the backing plate 12 and is applied by a suitable bell crank lever 54 arranged in a space between the upper web of the band 50 and the backing plate 12 and connected to a cable or the like 56 passing through the backing plate and forming part of a "Bowden" operating connection. The end of the bell crank lever 54 is shown directly connected to the upper web of the band 50 by means such as the pivot 58, while the knee of the bell crank lever is provided with a pivot 60 passing through a slot 62 in a web of the band 50 and connected by a link 64 to a novel adjustable thrust member 66 carried by the lower web of the band 50, the thrust member 66 being formed at its end by a semicircular notch engaging the anchor post 52 and transmitting the brake directly thereto when the drum is turning in a clockwise direction.

In the particular arrangement of the novel adjustable thrust member 66, which is illustrated in the drawings, a lower web of the member 50 is formed with a slot 68 extending inwardly from its end and in which is arranged a lengthwise movable worm or the like 70. The worm 70 is formed on its opposite sides with keyways 72 (Fig. 6) extending lengthwise of the worm and receiving the parts of the web on opposite sides of the slot 68, as shown in Figure 7. This permits the worm 70 to shift lengthwise of the web but prevents it from turning. In the particular arrangement shown in the drawings, the worm 70 is formed intervally on the end of the thrust member 66.

Figure 6:
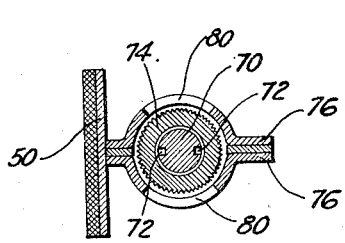
Figure 6 is a section through the friction means on the line 6—6 of Figure 3 and showing the means for operating the brake adjustment.
Figure 7:
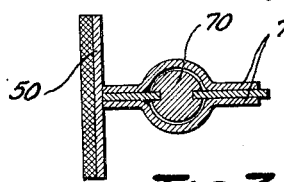
Figure 7 is a section through the friction means on the line 7—7 of Figure 3 and showing the manner in which the friction means is keyed to the web of the band.

The lengthwise movement of the worm 70 and therefore the adjustment of the brake for wear is accomplished by means such as a nut 74 threaded on the worm 70 and formed with a serrated outer surface which is shown in Figure 6, engageable with a suitable tool for turning the nut to force the worm 70 to move lengthwise. The nut 74 is prevented from moving lengthwise with the worm 70 by a pair of members such as the stampings 76 which are secured by spot-welding or otherwise to opposite sides of the lower web of the member 50 and which are formed with registering longitudinal grooves forming a socket enclosing the worm 70 and with semicircular annular grooves forming an annular recess which receives the nut 74. The stampings 76 are formed with openings 80 for the passage of a tool used in turning the nut in making the above described adjustment.

While two illustrative embodiments of my invention have been described in detail, it is not my intention to limit the scope of the invention to those particular embodiments or otherwise than by the terms of the appended claims.

I claim:

1. A brake comprising a drum, friction means having an anchorage engaging its ends and arranged to have one end anchor thereon when the drum is turning in one direction and to have the other end anchor thereon when the drum is turning in the other direction, a floating lever having a part pivotally engaging one of said ends on one side of said anchorage and having a slot encircling the anchor and elongated in the direction of the drum circumference to permit the lever to shift slightly circumferentially of the brake with said ends to permit either of said ends to anchor, a link connecting the other of said ends to a part of the lever on the other side of said anchorage.

2. A brake comprising a drum, a support at the open side of the drum, friction means within the drum having an anchorage engaging its ends and arranged to have one end anchor thereon when the drum is turning in one direction and to have the other end anchor thereon when the drum is turning in the other direction, a floating bell-crank lever having one end pivotally engaging one of said ends of the friction means on one side of said anchorage, said floating lever including two stampings on opposite sides of the ends of the friction means and which are connected by thrust parts arranged one inside and the other outside the anchor (radially of the brake) and both of which engage one end of the friction means to position the lever when the brake is released, and a link connecting the other of said ends to a part of the lever on the other side of said anchorage by engagement with one of said thrust parts, said lever having an operating part extending into the space between the friction means and the support at one side of the anchorage.

3. A brake comprising a drum, friction means having an anchorage engaging its ends and arranged to have one end anchor thereon when the drum is turning in one direction and to have the other end anchor thereon when the drum is turning in the other direction, a floating lever having a part pivotally engaging one of said ends on one side of said anchorage, and having a relatively large clearance opening encircling said anchorage, a link connecting the other of said ends to a part of the lever on the other side of said anchorage.

4. A brake lever having a plate parallel to itself and fixedly secured thereto by a pair of pivot posts, the lever and said plate having registering clearance openings for a brake anchor.

5. A brake having friction means, an anchorage between and engaging one of the ends of said means, a bell crank lever engaging one end of said means, an adjustable thrust member carried by the other end of said means, and engaging the anchorage, and a link connecting the bell crank lever and said member.

6. A brake comprising a drum, an anchor, friction means having separable ends embracing said anchor between them and one of which ends seats against the post when the brake is applied with the drum turning in one direction and the other of which ends seats against the anchor when the brake is applied with the drum turning in the other direction, and a floating lever beside said ends and formed with an opening through which said anchor projects with the lever entirely encircling the anchor, said lever having parts projecting laterally therefrom and acting on said ends respectively, one of said parts being outside and the other inside the anchor radially of the brake.

7. A brake comprising a drum, an anchor, friction means having separable ends embracing said anchor between them and one of which ends seats against the post when the brake is applied with the drum turning in one direction and the other of which ends seats against the anchor when the brake is applied with the drum turning in the other direction and a floating lever adjacent said ends and formed with an opening through which said anchor projects with the lever entirely encircling the anchor, said lever having parts acting on said ends respectively, one of said parts being outside and the other inside the anchor radially of the brake.

8. A brake comprising a drum, an anchor, friction means having separable ends embracing said anchor between them and one of which ends seats against the post when the brake is applied with the drum turning in one direction and the other of which ends seats against the anchor when the brake is applied with the drum turning in the other direction, and a floating lever beside said ends and which is pivoted to one of said ends, together with a part mounted on the other of said ends so as to be laterally and radially rigid therewith but circumferentially adjustable and engaging said anchor and on which said lever acts.

9. A brake comprising a drum, a backing plate at the open side of the drum having mounted thereon at least one cylindrical anchor post projecting into the drum, friction means with separable ends having partially-cylindrical sockets pivotally engaging opposite sides of the anchor post and one of which ends is adjustable circumferentially of the brake to compensate for wear of the brake, and a floating lever adjacent the anchor post and operatively acting on said ends, said lever having a plate secured thereto and provided with an opening receiving said post.

10. A brake comprising a drum, a backing plate at the open side of the drum having mounted thereon at least one cylindrical anchor post projecting into the drum, friction means with separable ends having partially-cylindrical sockets pivotally engaging opposite sides of the anchor post, a substantially right-angle floating lever having a horizontal arm pivoted at its end to one end of the friction means and having an operating arm extending upwardly between the backing plate and the friction means and having operating means connected to its upper end, and a thrust link pivoted at its ends to the other end of the friction means and to the lever at the junction of said arms and which extends past said anchor.

11. A brake comprising an anchor, friction means having separable ends one of which seats directly against one side of the anchor and the other of which has a socket extending into its end and formed at least in part of a separately-formed stamping secured to said end, a thrust part having at one end a stem adjustably received in said socket and engaging the other side of the anchor at its other end, a part carried by said thrust part and extending past the anchor, and applying means acting on said one end and on said part which extends past the anchor.

12. A brake comprising an anchor, friction means having separable ends one of which seats directly against one side of the anchor and the other of which has a socket extending into its end, a thrust part having at one end a stem adjustably and non-rotatably received in said socket and engaging the other side of the anchor at its other end, a part carried by said thrust part and extending past the anchor, and applying means acting on said end of the friction means which seats directly against the anchor and on said part which extends past the anchor.

13. In combination a brake applying lever pivoted at one end on the web of a brake shoe and having a pivot projecting through an arcuate slot in the web and a shoe engaging link mounted on said pivot on the side of the web opposite said lever.

EUGENE G. McDONALD.